June 20, 1950  N. F. ANDREWS  2,511,960
CORN HARVESTER

Filed Jan. 2, 1947  2 Sheets-Sheet 1

INVENTOR
NORMAN F. ANDREWS
BY
ATTORNEYS

June 20, 1950 N. F. ANDREWS 2,511,960
CORN HARVESTER
Filed Jan. 2, 1947 2 Sheets-Sheet 2
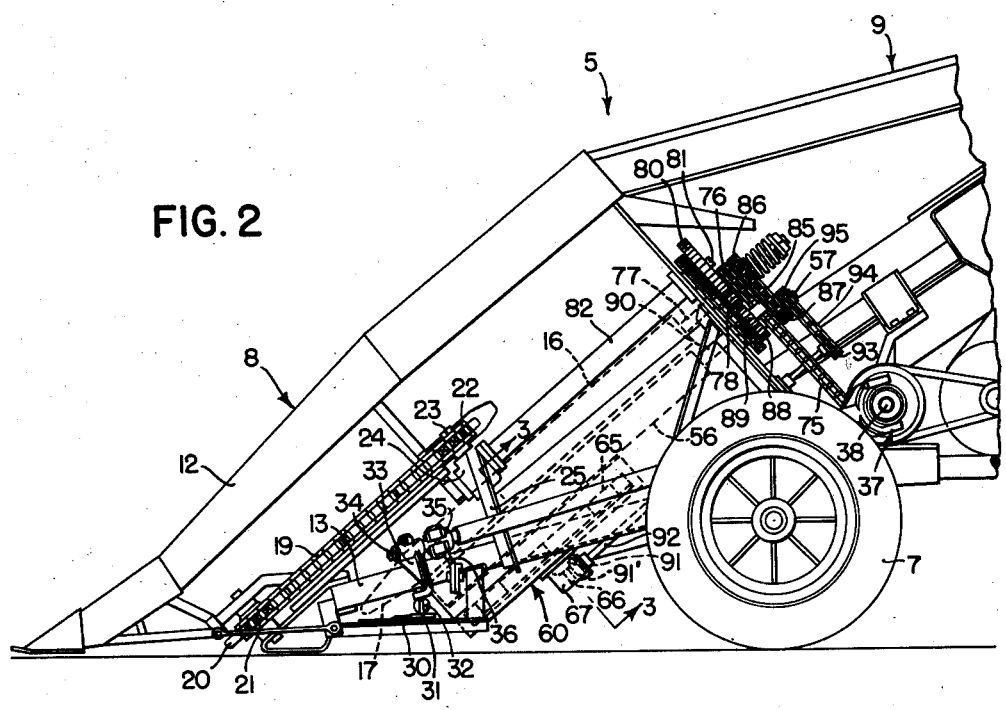
FIG. 2
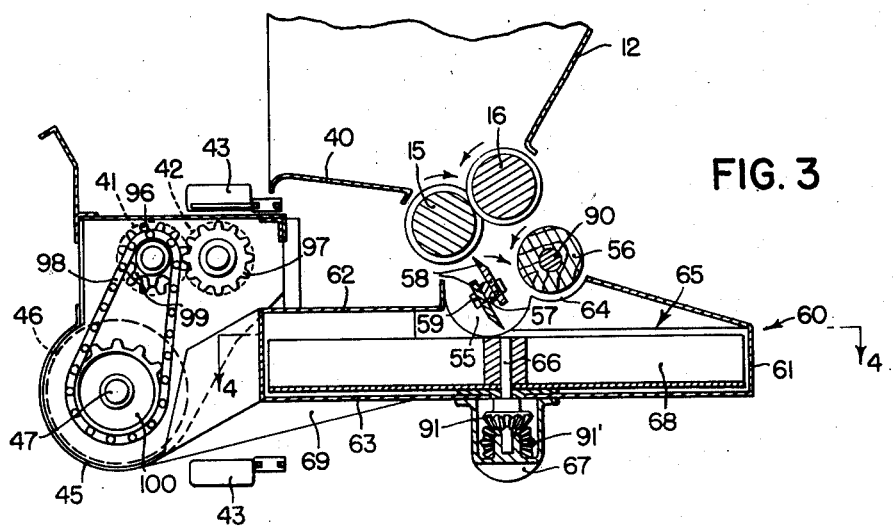
FIG. 3
INVENTOR
NORMAN F. ANDREWS
BY 
ATTORNEYS

Patented June 20, 1950

2,511,960

UNITED STATES PATENT OFFICE 2,511,960

CORN HARVESTER

Norman F. Andrews, Moline, Ill., assignor to Deere & Company, Moline, Ill., a corporation of Illinois Application January 2, 1947, Serial No. 719,883

10 Claims. (Cl. 56—66)

The present invention relates generally to corn harvesters and more particularly to that class of corn harvesters in which the cornstalks are severed from the field and are conveyed into the machine, after which the ears of corn are removed therefrom.

One of the principal objects of the present invention relates to the provision of a novel and improved corn harvester of the class mentioned above, which is simpler and less expensive to manufacture, but which is more efficient in operation than those heretofore known in the art.

It has been recognized for many years that the ears of corn can be snapped from the stalks more efficiently and with less loss of kernels by first cutting the stalks from their roots in the field and conveying them into the machine where any kernels which may be dislodged by the snapping rolls from the ears can be collected and saved, as compared to the conventional corn picker which is commonly sold in commercial form but which merely snaps the ears from the stalks as the latter stand in the field, while any loose kernels of corn are usually dropped on the ground in the corn row.

Heretofore, however, the design of corn harvesters of the type which sever the stalks before the ears are snapped has been considerably more complicated than that of the conventional corn picker, with the result that the cost of manufacturing such machines was high enough to make them economically impractical. These machines were large and heavy and because of the small demand for this type of machine they have not gone into mass production.

Accordingly, it is another object of the present invention to provide a corn harvester of this type by merely adding a few simple parts to a corn picker of a well known commercial design, which is already in mass production. This permits the corn harvester to be produced at a much lower cost than if an entirely different design were necessary, and permits the machine to be economically manufactured even in small numbers.

These and other objects and advantages of the present invention will be apparent to those skilled in the art after a consideration of the following description, in which reference is had to the drawings appended hereto, in which Figure 1 is a fragmentary top plan view of a corn harvester embodying the principles of the present invention;

Figure 2 is a side elevational view of the harvester;

Figure 3 is a sectional view taken along a line 3—3 in Figure 2, and drawn to an enlarged scale.

Figures 1, 4:
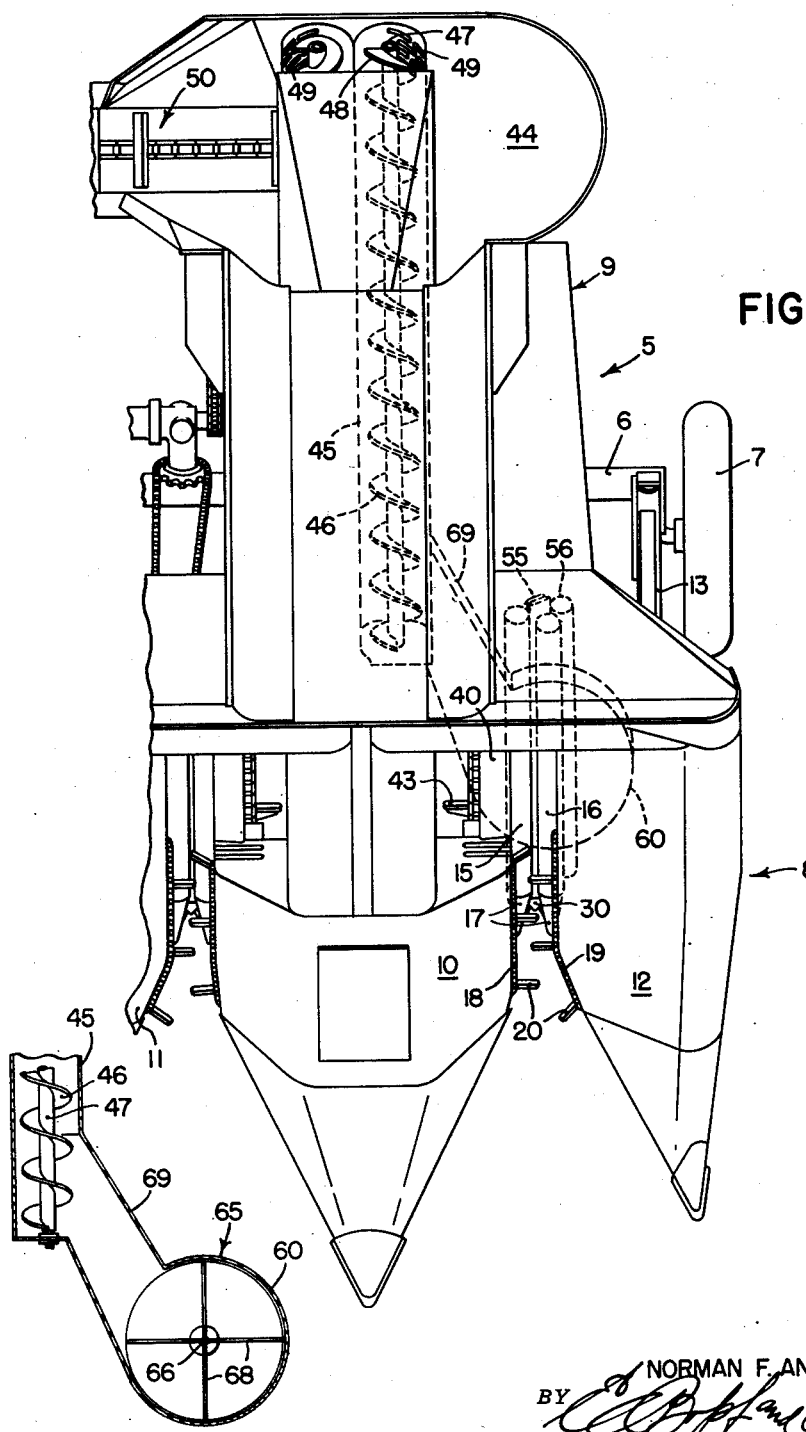
Figure 4 is a sectional view taken along a line 4—4 in Figure 3 and drawn to the scale of Figure 1.

Referring now to the drawings, the corn harvester is indicated in its entirety by reference numeral 5 and may consist of a corn picker of the type shown and claimed in a co-pending application, Serial No. 564,292, filed November 20, 1944, now Patent 2,494,080, by several joint inventors, including myself. Inasmuch as the general corn harvester structure may be of any suitable type and need not be precisely as illustrated, only a brief description thereof is considered necessary here.

The machine shown is a two-row tractor drawn type of corn picker having a frame including a main transversely extending tubular axle 6 carried on opposite ends thereof, respectively, on a pair of laterally spaced ground wheels, one of which is indicated by reference numeral 7. The machine 5 includes a main body portion comprising a forwardly extending gatherer unit 8 and a rearwardly extending husking unit 9 carried in more or less balanced relation about the main tubular beam 6.

The gatherer unit 8 includes a centrally disposed sheet metal gatherer 10 and a pair of outer gatherers 11, 12, supported on a plurality of forwardly extending tubular frame members, one of which is indicated by reference numeral 13, Figure 2, rigidly fixed to the tubular axle member 6 and extending forwardly therefrom. Inasmuch as the equipment is duplicated for the two rows, the parts associated with one-half of the machine only will be described in detail.

A pair of more or less conventional snapping rolls 15, 16 are disposed side by side in parallel relation and are rotatably supported in the gatherer unit 8 to provide snapping mechanism to receive therebetween the stalks of corn which are gathered between the center and outer gatherers 10, 12. The snapping rolls 15, 16 are provided with forwardly tapering front end portions 17 disposed in close proximity to the ground, and the rolls 15, 16 are inclined upwardly and rearwardly therefrom. A pair of conventional gatherer chains 18, 19 are mounted on the gatherers 10, 12, respectively, and are provided with laterally extending stalk engageable arms 20, which are moved rearwardly with the chains 18, 19 to urge the stalks toward the snapping rolls 15, 16. As shown in Figure 2, the gatherer chain 19 is trained around a pair of sprockets 21, 22 within the sheet metal gatherer 12, the rear sprocket 22 being mounted on a suitable drive shaft 23 extending upwardly from a gear casing 24 carried on a bracket 25 supported on the forwardly extending frame member 13.

Directly beneath the tapering forward portions 17 of the snapping rolls 15, 16 is a severing means comprising a transversely extending sickle blade 30 mounted for reciprocatory movement transversely of the direction of travel for the purpose of cutting the cornstalks as they are gathered between the snapping rolls 15, 16. The sickle 30 is provided with a knife head 31 connected by a ball and socket joint 32 to a driving arm 33, which is fixed to an oscillatory drive shaft 34 mounted in a bearing 35 which is supported on a bracket 36 carried on the frame member 13. The drive shaft 34 extends rearwardly alongside the frame member 13 and is oscillated about its major axis by means of a wobble mechanism 37 which receives power from a drive shaft 38. Further details of this sickle drive mechanism may be found in Patent 2,297,317, granted September 29, 1942 to Paradise et al. The snapping rolls 15, 16 are rotated in relatively opposite directions, as indicated by the arrows in Figure 3, to draw the severed cornstalks downwardly between the rolls to snap the ears of corn therefrom. The ears are discharged laterally over an apron 40 to the forward ends of a pair of conventional husking rolls 41, 42 disposed side by side in laterally spaced relation to the snapping rolls 15, 16 and substantially parallel to the latter. The husking rolls 41, 42 extend upwardly and rearwardly within the husking unit 9 and the ears of corn are moved along the rolls 41, 42 by means of an ear conveyor 43, which discharges the husked ears into a hopper 44 disposed under the rear end of the husking unit 9.

Directly beneath the husking rolls 41, 42 is a husk conveyor comprising a trough 45, within which is disposed an auger type conveyor 46 comprising a shaft 47 and a helical vane 48 wound around the shaft. The auger 46 is rotated to move the husks and silks from the ears rearwardly to discharge the same over the rear of the hopper 44 upon the ground. The bottom of the conveyor trough 45 is provided with a plurality of slots 49 near the rear end of the trough above the hopper 44, through which pass any loose kernels of corn which happen to be dislodged from the ears by the action of the husking rolls. A wagon elevator 50 is inclined upwardly and laterally from the bottom of the hopper 44 for delivering the ears of corn, together with any loose kernels, into a wagon (not shown), which is drawn alongside the harvester 5.

Beneath the snapping rolls 15, 16 is disposed rotary chopper means including a pair of cooperative chopping elements 55, 56, one of the elements 55 comprising a shaft 57 rotatably mounted in a position parallel to the snapping rolls 15, 16, and a pair of longitudinally extending chopping blades 58 projecting radially outwardly from the shaft 57 and secured thereto by a series of bolts 59. The other chopping element 56 comprises a roll, preferably of wood, which rotates in a direction relatively opposite to that of the element 55 and cooperates with the latter to pull the stalks downwardly between the snapping rolls 15, 16 and to chop the stalks into small pieces which drop into a slinger 60.

The slinger 60 comprises stalk-receiving means made up of a flat cylindrical housing 61, preferably of sheet metal, having top and bottom wall portions 62, 63 and disposed beneath the chopping elements 55, 56. The top wall 62 is provided with an inlet opening 64 beneath the chopping elements, through which the pieces of chopped stalks drop into the housing 61. A rotary fan member 65 is disposed within the cylindrical housing 61 and is provided with a shaft 66 journaled within a bearing 67 beneath the bottom wall 63. The rotor 65 is provided with a plurality of radial blades 68 which engage the pieces of cornstalks and propel them by centrifugal force through a discharge duct 69, which is disposed tangentially of the housing 61. The duct 69 extends laterally and rearwardly and communicates with the forward end of the auger trough 45, into which the pieces of chopped cornstalks are thrown by the centrifugal action of the slinger rotor 65.

Power is transmitted for driving the snapping rolls by means of a power transmitting chain 75 which receives power from a lower sprocket (not shown) and is trained over an upper sprocket 76 on the rear end of a shaft 77 connected to one of the snapping rolls 16. The shaft 77 also carries a gear 78 which meshes with a similar gear (not shown) on the other snapping roll 15 for driving the latter and also with a gear 80, which is connected through a shaft 81, which passes forwardly through a tube 82 and gearing (not shown) within the gear casing 24 to drive the sprocket shaft 23 which drives the gatherer chain 19. The chopping elements 55, 56 receive power through a chain 85 trained over a pair of sprockets 86, 87 mounted on the snapping roll shaft 77 and on the chopping element shaft 57, respectively. A gear 88 is also mounted on the shaft 57 and meshes with a gear 89 on the shaft 90 which carries the chopping roller 56. The slinger rotor 65 is driven by a pair of meshing bevel gears 91, 91' disposed within the bearing housing 67 and respectively mounted on the fan shaft 66 and a drive shaft 92, which extends upwardly and rearwardly and is provided at its rear end with a sprocket 93 which is connected by a power transmitting chain 94 with a sprocket 95 mounted on the shaft 57.

The husking rolls 41, 42 are driven by a suitable power transmitting mechanism (not shown) at their rear ends, the forward ends of the husking rolls being interconnected by a pair of meshing gears 96, 97 and drive the auger shaft 47 by means of a chain 98 which is trained over a sprocket 99 on one of the rolls 41 and over a sprocket 100 mounted on the forward end of the auger shaft 47.

During operation, the implement 5 is drawn forwardly in the field to gather one row of cornstalks between the center gatherer 10 and the outer gatherer 12 and another row of cornstalks between the center gatherer 10 and the other outer gatherer 11. The row of stalks is guided by the gatherers and the chains 18, 19 between the forward ends 17 of the snapping rolls, and are severed by the sickle 30, after which the gatherer chains 17 move the stalks rearwardly between the two snapping rolls 15, 16, which rotate oppositely to pass the stalks downwardly between the rolls and snap the ears of corn from the stalks, the ears falling over the apron 40 to the husking rolls, as explained above. The stalks are pulled downwardly by the oppositely rotating chopping elements 55, 56 and are chopped into small pieces by the knife blades 58, which cooperate with the smooth roll 56 to provide a chopping action. The chopped pieces of cornstalks fall into engagement with the blades 68 of the rotary slinger 65, which throws the pieces by centrifugal force toward a point of discharge, or through the tangential duct 69 into the forward end of the auger trough 45. Any kernels of corn which are dislodged by the action of the snapping rolls 15, 16 drop between the latter into the slinger housing 61 and are thrown through the tangential duct 69 into the trough 45. The auger 46 moves the chopped cornstalks and leaves, together with any loose kernels upwardly and rearwardly through the trough 45 and discharges the trash over the rear edge of the hopper 44, while the loose kernels drop through the slots 69 into the hopper 44, thus saving all of the loose kernels as well as the ears of corn, which are conveyed by the wagon elevator 50 into the wagon or truck.

The chopped stalks and leaves are discharged to the ground behind the machine, and are easily plowed under the ground and are completely covered to thus prevent the development of any corn borers which are in the cornstalks, in a manner well known to those skilled in the art. Thus, it will be evident that a machine of the type described herein is effective not only in saving all of the corn, but in preventing the development of the corn borer.

I claim:

1. In a crop harvester having a mobile frame and stalk-severing and gathering mechanism carried thereon and through which crops are passed from front to rear as the harvester is moved forwardly through a field, the improvement residing in mechanism for receiving crops from the severing and gathering mechanism, comprising: a housing to be carried by the frame and having wall portions, one of which has an elongated inlet opening positionable to receive crops after passing of such crops through the gathering mechanism, and another of which wall portions includes a crop-discharge opening; means carried by the housing for effecting the transfer of crops from the gathering mechanism to the interior of the housing, including a pair of rotatable chopping rolls journaled on the housing over and generally coextensive with the inlet opening in the housing; and means for effecting transfer of crops out of said housing, including a rotatable element inside the housing for moving the crops toward the discharge opening in the housing.

2. In a harvester having a carrying frame adapted to travel forwardly over a field of standing stalks: the combination of stalk-severing means carried by a forward portion of the frame; gathering mechanism carried by the frame behind and for receiving severed stalks from the severing means; a rotary chopper carried by the frame beneath and for receiving stalks from the gathering mechanism and for chopping such stalks; and a rotary slinger separate from the chopper and rotatable relative to the chopper and carried by the frame beneath said chopper for receiving the chopped stalks and propelling them toward a point of discharge.

3. In a corn harvester having a carrying frame adapted to travel forwardly over a field of standing stalks: the combination of stalk-severing means carried by a forward portion of the frame; gathering mechanism carried by the frame behind and for receiving severed stalks from the severing means; a pair of cooperative stalk-chopping rolls carried by the frame beneath said gathering mechanism for pulling the severed stalks downwardly through the mechanism and for chopping such stalks into pieces; and a slinger comprising a substantially cylindrical housing carried by the frame beneath said chopping rolls for receiving the chopped pieces and having a tangentially arranged discharge duct, and a rotary member within said housing having blades engageable with the chopped pieces for propelling them out through the discharge duct.

4. In a corn harvester having a carrying frame adapted to travel forwardly over a field of standing ear-bearing corn stalks: the combination of a stalk-severing knife carried by a forward portion of the frame; a pair of parallel snapping rolls carried by the frame and inclined upwardly and rearwardly from said knife and rotatable to pass severed stalks downwardly therethrough to remove ears of corn from such stalks; a pair of cooperative chopping rolls carried by the frame beneath and substantially parallel to said snapping rolls for pulling the severed stalks downwardly through said snapping rolls and for chopping such stalks into pieces; and a centrifugal slinger comprising a flat cylindrical housing carried by the frame beneath said chopping rolls and generally parallel thereto and having a tangentially arranged discharge duct, and a rotary member within said housing having blades engageable with the pieces of stalk for propelling them out through the discharge duct.

5. In a corn harvester having a frame adapted to travel forwardly over a field of standing ear-bearing corn stalks: the combination of stalk-severing means carried by a forward portion of the frame; snapping mechanism carried by the frame behind and for receiving severed stalks from the severing means and for removing ears from such stalks; stalk-chopping means carried by the frame beneath said snapping mechanism for pulling the severed stalks downwardly through the mechanism and for chopping such stalks into pieces; an ear-husking box carried by the frame in spaced relation to said chopping means and in position to receive ears from the gathering mechanism, said husking box including a husk conveyor and a separating screen over which said conveyor moves husks to separate therefrom any loose kernels of corn; and a slinger comprising a housing carried by the frame beneath said chopping means for receiving chopped pieces of stalk, a member movable within said housing having means engageable with and to propel such pieces and any loose kernels received in said housing from the snapping mechanism or the chopping means, and a discharge duct associated with said housing and communicating with said husk conveyor for conducting to the latter the chopped stalks and the last mentioned loose kernels.

6. In a corn harvester having a frame adapted to travel forwardly over a field of standing ear-bearing corn stalks: the combination of stalk-severing means carried by a forward portion of the frame; snapping mechanism carried by the frame behind and for receiving severed stalks from the severing means and for removing ears from such stalks; a pair of cooperative stalk-chopping rolls carried by the frame beneath said snapping mechanism for pulling the severed stalks downwardly through the mechanism and for chopping such stalks into pieces; an ear-husking box carried by the frame in spaced relation to said chopping rolls and in position to receive ears from the gathering mechanism, said husking box including a husk conveyor and a separating screen over which said conveyor moves husks to separate therefrom any loose kernels of corn; and a slinger comprising a cylindrical housing carried by the frame beneath said chopping rolls for receiving chopped pieces of stalks, a rotary member within said housing having blades engageable with and to propel such pieces and any loose kernels received in said housing from the snapping mechanism or the chopping rolls, and a tangentially arranged discharge duct associated with said housing and communicating with said husk conveyor for conducting to the latter the chopped stalks and the last mentioned loose kernels.

7. In a corn harvester having a frame adapted to travel forwardly over a field of standing ear-bearing corn stalks: the combination of stalk-severing means carried by a forward portion of the frame; snapping mechanism carried by the frame behind the severing means for receiving severed stalks and for removing ears therefrom; a pair of cooperative stalk-chopping rolls carried by the frame beneath said snapping mechanism for pulling the severed stalks downwardly through said mechanism and chopping such stalks into pieces; an ear-husking box carried by the frame in spaced relation to the chopping rolls and in position to receive ears from the gathering mechanism, said husking box including a husk-receiving trough and an auger rotatably disposed therein for moving the husks therethrough, said trough having openings therein for passing loose kernels therethrough to separate them from the husks; and a slinger comprising a cylindrical housing carried by the frame and disposed beneath said chopping rolls for receiving chopped pieces of stalk, a rotary member within said housing having blades engageable and for propelling the chopped pieces of stalk and any loose kernels dislodged by the snapping mechanism or the chopping rolls, and a tangentially arranged discharge duct associated with said housing and communicating with said auger trough for conducting to the latter the chopped stalks and the last mentioned loose kernels.

8. In a corn harvester having a frame adapted to travel forwardly over a field of standing ear-bearing corn stalks: the combination of a stalk-severing knife carried by a forward portion of the frame; a pair of parallel snapping rolls carried by the frame and inclined upwardly and rearwardly from said knife and rotatable to pass the stalks downwardly therethrough to remove the ears of corn from such stalks; a pair of cooperative chopping rolls carried by the frame and disposed beneath and substantially parallel to said snapping rolls for pulling the severed stalks downwardly through said snapping rolls and for chopping such stalks into pieces; an ear-husking box carried by the frame and spaced laterally from said chopping rolls and disposed generally parallel thereto and in position to receive ears from the gathering mechanism, said husking box including a husk-receiving trough and an auger rotatably disposed therein for moving the husks therethrough, said trough having openings therein for passing loose kernels therethrough to separate them from the husks; and a slinger comprising a cylindrical housing carried by the frame and disposed beneath said chopping rolls for receiving chopped pieces of stalk, a rotary member within said housing having blades engageable with and for propelling the chopped pieces of stalk and any loose kernels dislodged by the snapping mechanism or the chopping rolls, and a tangentially arranged discharge duct associated with said housing and communicating with said auger trough for conducting to the latter the chopped stalks and the last mentioned loose kernels.

9. In a corn harvester having a carrying frame adapted to travel forwardly over a field of standing stalks and including forwardly located means for severing stalks from the ground and gathering mechanism rearwardly of the severing means for receiving severed stalks and for moving the stalks downwardly, the improvement comprising: a pair of cooperative stalk-chopping rolls having means for the mounting thereof on the frame beneath the gathering mechanism to receive stalks therefrom and to chop such stalks into pieces; a cylindrical housing having means for the mounting thereof on the frame beneath and to receive chopped stalks from the rolls, and including a tangentially arranged discharge duct; and a rotary member within the housing having blades engageable with and for propelling the chopped stalks out through the discharge duct.

10. In a corn harvester having a frame adapted to travel forwardly over a field of standing ear-bearing corn stalks: the combination of a stalk-severing knife carried by a forward portion of the frame; a pair of parallel snapping rolls carried by the frame and inclined upwardly and rearwardly from said knife and rotatable to pass the stalks downwardly therethrough to remove the ears of corn from such stalks; a housing carried by the frame beneath the snapping rolls and having wall portions, one of which has an elongated inlet opening generally paralleling and below the snapping rolls to receive stalks therefrom, and another of which wall portions includes a stalk-discharge opening; means carried by the housing for effecting transfer of stalks from the snapping rolls to the interior of the housing, including a pair of rotatable chopping rolls journaled on the housing over and generally coextensive with the inlet opening in the housing; and means for effecting transfer of crops out of said housing, including a rotatable element inside the housing for moving the crops toward the discharge opening in the housing.

NORMAN F. ANDREWS.

REFERENCES CITED

The following references are of record in the file of this patent:

UNITED STATES PATENTS

| Number | Name | Date |
|---|---|---|
| 1,814,723 | MacGregor | July 14, 1931 |
| 1,832,094 | Campbell | Nov. 17, 1931 |
| 2,115,234 | Preston | Apr. 26, 1938 |
| 2,188,522 | Alfs | Jan. 30, 1940 |
| 2,333,901 | Swenson | Nov. 9, 1943 |
| 2,385,193 | Burgin | Sept. 18, 1945 |